US012035800B2

United States Patent
Ogunsina et al.

(10) Patent No.: US 12,035,800 B2
(45) Date of Patent: Jul. 16, 2024

(54) ELECTRIC TOOTHBRUSH SYSTEM

(71) Applicant: PLAYBRUSH LIMITED, London (GB)

(72) Inventors: Tolulope Ogunsina, London (GB); Paul Varga, London (GB); Matthaus Ittner, London (GB); Patrick Diem, London (GB); Wiktor Grajkowski, London (GB)

(73) Assignee: PLAYBRUSH LIMITED, London (GB)

( * ) Notice: Subject to any disclaimer, the term of this patent is extended or adjusted under 35 U.S.C. 154(b) by 728 days.

(21) Appl. No.: 17/058,220

(22) PCT Filed: May 24, 2019

(86) PCT No.: PCT/GB2019/051438
§ 371 (c)(1),
(2) Date: Nov. 24, 2020

(87) PCT Pub. No.: WO2019/224555
PCT Pub. Date: Nov. 28, 2019

(65) Prior Publication Data
US 2021/0186196 A1    Jun. 24, 2021

(30) Foreign Application Priority Data

May 24, 2018  (GB) ..................... 1808555

(51) Int. Cl.
*A46B 15/00* (2006.01)
*G09B 19/00* (2006.01)

(52) U.S. Cl.
CPC ...... *A46B 15/0006* (2013.01); *A46B 15/0008* (2013.01); *G09B 19/0084* (2013.01)

(58) Field of Classification Search
CPC ............ A46B 15/0006; A46B 15/0008; A46B 15/0012; A46B 15/0004; A61C 17/221; A61C 17/3481
See application file for complete search history.

(56) References Cited

U.S. PATENT DOCUMENTS 8,272,091 B2 * 9/2012 Hwang ................. A61C 17/32
                                                     15/22.1
8,863,343 B2 * 10/2014 Iwahori ............... A61C 17/221
                                                     15/22.1

(Continued)

FOREIGN PATENT DOCUMENTS

GB    2541416 A    2/2017
WO    2007122491 A2    11/2007

(Continued)

OTHER PUBLICATIONS

Corresponding PCT Application No. PCT/GB2019/051438, International Search Report and Written Opinion mailed Sep. 10, 2019.

(Continued)

*Primary Examiner* — Laura C Guidotti
(74) *Attorney, Agent, or Firm* — Cooper Legal Group LLC

(57) ABSTRACT

An electric toothbrushing device is disclosed, the device comprising vibration means for producing vibration of a toothbrush head and a controller for controlling the vibration means. The device also comprises a motion sensor for sensing motion of the toothbrushing device to produce motion data, and a signal analysis unit for analysing the motion data to produce a feedback signal. The controller is arranged to adjust the vibration produced by the vibration means in dependence on the feedback signal. Such a configuration can be used to improve the feedback provided to the user and/or help to correct deficiencies in the user's brushing technique.

12 Claims, 12 Drawing Sheets

(56) References Cited

U.S. PATENT DOCUMENTS

| | | | |
|---|---|---|---|
| 10,874,493 B2 * | 12/2020 | Vetter | ............... A46B 15/0002 |
| 2009/0215015 A1 | 8/2009 | Chu | |
| 2009/0320227 A1 | 12/2009 | Cohen et al. | |
| 2016/0228225 A1 | 8/2016 | Prendergast et al. | |
| 2017/0188836 A1 | 7/2017 | Xi et al. | |
| 2018/0098620 A1 | 4/2018 | Lee et al. | |
| 2018/0125623 A1 | 5/2018 | Serval et al. | |

FOREIGN PATENT DOCUMENTS

| WO | 2017145033 A1 | 8/2017 |
|---|---|---|
| WO | 2019034854 A1 | 2/2019 |

OTHER PUBLICATIONS

Corresponding Great Britain Patent Application No. GB1808555.5, Search Report dated Nov. 27, 2018.

* cited by examiner

ELECTRIC TOOTHBRUSH SYSTEM

The present invention relates to an electric toothbrush, and in particular an electric toothbrush which can detect brushing motions and provide feedback to the user.

An electric toothbrush is a toothbrush that causes vibrations of the bristles in a brush head in order to clean teeth. The vibrations may be linear or rotary, or a combination of the two. The vibrations are typically produced by a motor or a piezoelectric crystal powered by a battery. The battery may be rechargeable, and may be charged through inductive charging. Typically the brush head is removable so that it can be replaced when worn.

In use, the user moves the toothbrush through the mouth in order to brush their teeth. Depending on the type of toothbrush and the brushing technique of the user, the movement may be from tooth to tooth, and/or may involve a brushing motion similar to that of a manual toothbrush.

In order for a user to maintain good oral health it is important that they brush their teeth correctly. To help a user brush their teeth attempts have been made to monitor how the user brushes their teeth and relay this information back to the user.

Previous attempts to monitor brushing techniques have included attaching a motion sensor to a toothbrush which monitors how the user is brushing their teeth. Often, the data from the motion sensor is sent to an application (app) or computer program, which is run on an external device e.g. a mobile phone or other portable device. The app or program then provides feedback to the user about how they have brushed their teeth.

For example, the document GB 2541416 in the name of the present applicant, the contents of which are incorporated herein by reference, discloses a manual toothbrush system which has an accelerometer fitted to a toothbrush holder. A processor is configured to determine the orientation of the toothbrush. The determination of the orientation may be used as inputs to control a game on an electronic computing device.

However, in current systems, the feedback provided to the user may be limited. For example, the feedback may alert the user to the fact that they are not brushing their teeth correctly but may not provide the user with information on how they may correct the deficiency. As such, it is often left up to the user to try and work out how they can improve their brushing technique. This may result in different deficiencies if the user is not sure what correction to apply.

Known electric toothbrushes allow the user to select various operation modes. For example, WO 2007/122491 discloses an electric toothbrush with a controller which can cause the toothbrush to operate in different operation modes. A display is also disclosed for providing feedback to the user. The device relies on a set up process to program the various operation modes, which may limit the extent to which operation of the device can be adapted to particular circumstances. Furthermore, the feedback provided to the user is limited.

It would therefore be desirable to provide an electric toothbrush which can help to correct deficiencies in the user's brushing technique and/or improve the feedback given to the user.

According to a first aspect of the present invention there is provided an electric toothbrushing device comprising:
 vibration means for producing vibration of a toothbrush head;
 a controller for controlling the vibration means;
 a motion sensor for sensing motion of the toothbrushing device to produce motion data; and
 a signal analysis unit for analysing the motion data to produce a feedback signal;
 wherein the controller is arranged to adjust the vibration produced by the vibration means in dependence on the feedback signal.

The present invention may provide the advantage that, by analysing the motion data to produce a feedback signal, and adjusting the vibration in dependence on the feedback signal, it may be possible to improve the feedback provided to the user and/or help to correct deficiencies in the user's brushing technique.

The toothbrushing device may be in the form of a toothbrush body which is attachable to a removable toothbrush head. This can allow the toothbrush head to be replaced when worn. Alternatively it would be possible to provide the toothbrushing device with a permanently attached toothbrush head.

The vibration means may be, for example, a motor or a piezoelectric device, such as a piezoelectric crystal, or any other suitable means for producing vibration of the toothbrush head. The motion data may comprise data produced by manual movement of the toothbrush by the user. The motion sensor may be an accelerometer and the motion data may be accelerometer data, although any other suitable means for producing motion data could be used instead.

Preferably the controller is arranged to control the speed and/or timings of the vibration produced by the vibration means in dependence on the feedback signal. For example, the controller may be arranged to temporarily stop or slow down the vibration produced by the vibration means in dependence on the feedback signal, in order to provide feedback to the user. This may be achieved, for example, by momentarily turning off the vibration means one or more times. The time for which the vibration is turned off is preferably sufficient to provide tactile or haptic feedback to the user, without significantly impacting on brushing. For example, the controller may turn off the vibration means for less than one second, or less than 0.8 seconds, or for around 0.5, 0.4, 0.3 or 0.2 seconds, or any other suitable value. The length of time and the number of times that the vibration is turned off may vary to indicate different brushing events (e.g. switch to a different area; end brushing; brushing too fast; and brushing too hard).

Alternatively or in addition, the controller may be arranged to set the speed of vibration produced by the vibration means to a predetermined value in dependence on the feedback signal.

In one embodiment the feedback signal comprises an indication of an area of the mouth being brushed. This can allow the speed and/or timings of the vibrations be adjusted based on where the user is brushing and/or has brushed. For example, the controller may be arranged to set the speed of vibration produced by the vibration means in dependence on the indication of an area of the mouth being brushed.

The device may further comprise a timer for measuring a brushing time. In this case the controller may be arranged to adjust the vibration produced by the vibration means in dependence on the brushing time. For example, the controller may be arranged to temporarily stop or slow down the vibration produced by the vibration means to indicate to a user when an area of the mouth has been brushed for a predetermined length of time. This may be achieved, for example, by momentarily turning off the vibration means.

Preferably the controller is arranged to aggregate times spent in a brushing area. Thus, even if the user has switched back and forth between different brushing areas, the total amount of time spent in any one area may be measured. In this case, the controller may be arranged to compare the aggregated time spent in a brushing area to a pre-set timing value, and to adjust the vibration in dependence on a result of the comparison. This can allow speed and/or timings of the vibrations to be adapted to suit particular brushing styles, for example if the user has a tendency to switch backwards and forwards between different brushing areas.

For example, the controller may be arranged to temporarily stop or slow down the vibration when the aggregated length of time spent in a brushing area is equal to or exceeds the pre-set timing value. This may be achieved, for example, by momentarily turning off the vibration means. This may provide a tactile or haptic indication to the user that they should switch to a different brushing area, which may help to ensure that the user spends the correct amount of time brushing each area, regardless of brushing style.

Alternatively or in addition, the controller may be arranged to stop or slow down the vibration when the aggregated length of time spent in a brushing area is equal to or exceeds the pre-set timing value (or some other value), until the device moves to another area. This may help to ensure that the user does not over-brush any particular area.

In any of the above arrangements, the device may further comprise a memory for storing the pre-set timing value. Preferably the pre-set timing value is configurable by a user. For example, the memory may initially be loaded with a default value, and this may be updated by the user, for example using an application running on a separate processing device. A pre-set timing value may be set for each of a plurality of different areas of the mouth. Different settings may be stored for different users. This can allow the brushing patterns of the device to be adjusted in dependence on the user's preferences and/or dental health.

The controller may be arranged to compare a total length of time spent brushing to a pre-set total brushing time value, and to adjust the vibration in dependence on a result of the comparison. For example, the controller may be arranged to temporarily stop the vibration one or more times (e.g. three times), or to stop or slow down the brushing, once the pre-set brushing time is exceeded. The total brushing time value may be stored in memory, and may be user configurable.

The device may further comprise a memory for storing a vibration speed value for each of a plurality of different areas of the mouth. In this case, the controller may be arranged to set the speed of vibration produced by the vibration means to the vibration speed value corresponding to the indication of the area of the mouth being brushed. In this case the vibration speed values may be configurable by the user, for example using an application running on a separate processing device. This can allow different vibration speeds to be set for different areas of the mouth. This may be desirable, for example, to help prevent overbrushing of sensitive areas.

In any of the above arrangements the signal analysis unit may comprise:
  means for producing, from the motion data, estimates of brushing dynamics and estimates of average acceleration; and
  means for producing an indication of an area of the mouth being brushed based on the estimates of brushing dynamics and the estimates of average acceleration.
In this case, the signal analysis unit may further comprise:
  means for performing a clustering process on the estimates of brushing dynamics and the estimates of average acceleration to produce clustering results, the clustering results comprising a plurality of clusters each of which represents a brushing area;
  means for storing the clustering results; and
  means for comparing subsequent estimates of brushing dynamics and estimates of average acceleration with the stored clustering results, thereby to yield an indication of an area of the mouth being brushed.

The above arrangements may help to provide an accurate indication of the area of the mouth being brushed.

In another embodiment (which may be provided alone or in combination with the above embodiments), the feedback signal comprises an indication of brushing dynamics. The indication of brushing dynamics is preferably an indication of how fast the user is moving the toothbrush. The controller may be arranged to compare the indication of brushing dynamics with a pre-set brushing dynamics value, and to adjust the vibration in dependence on a result of the comparison. This may allow the speed and/or timings of the vibrations be adjusted based on how fast the user is brushing and/or has brushed.

In this embodiment, the controller may be arranged such that, when the indication of brushing dynamics is equal to or exceeds the pre-set brushing dynamics value, the vibration is temporarily stopped or slowed down. This may be achieved, for example, by momentarily turning off the vibration means. This may provide a tactile or haptic indication to the user that they are brushing too fast, and encourage them to slow down.

Alternatively or in addition, the controller may be arranged such that, when the indication of brushing dynamics is equal to or exceeds the pre-set brushing dynamics value, the vibration is stopped or slowed down until the indication of brushing dynamics is less than the pre-set brushing dynamics value. This may help to ensure that the user does not brush too fast.

In order to obtain the indication of brushing dynamics, the device may comprise means for filtering the motion data to remove gravity components and/or components due to vibration of the toothbrush head. This may allow an indication of brushing dynamics to be provided which gives an indication of the manual movement of the toothbrush by the user.

The device may comprise a memory for storing a brushing dynamics value for each of a plurality of different areas of the mouth. In this case the controller may be arranged to compare the indication of brushing dynamics with the brushing dynamics value corresponding to an indication of the area of the mouth being brushed. The brushing dynamics values may be configurable by the user, for example using an application running on a separate processing device. This can allow different brushing speeds to be set for different areas of the mouth.

In a further embodiment (which may be provided alone or in combination with the above embodiments), the device further comprises means for producing a pressure signal indicating a pressure applied to the toothbrush head. The controller may be arranged to compare the pressure signal with a predetermined pressure value, and to adjust the vibration in dependence on a result of the comparison. In this disclosure, the term "pressure" is preferably used in its general sense to indicate a force exerted on the toothbrush head.

In this embodiment, the controller may be arranged such that, when the pressure signal is equal to or exceeds the pre-set pressure value (or some other value), the vibration is temporarily stopped or slowed down. This may be achieved, for example, by momentarily turning off the vibration means. This may provide a tactile or haptic indication to the user that they are brushing too hard, and encourage them to reduce the pressure applied to the teeth.

Alternatively or in addition, the controller may be arranged such that, when the pressure signal is equal to or exceeds the pre-set pressure value, the vibration is stopped or slowed down until the pressure signal is less than the pre-set pressure value. This may help to ensure that the user does not brush too hard.

The means for producing a pressure signal may comprise, for example, a switch which is activated when the pressure applied to the toothbrush head exceeds a certain value. However, in a preferred embodiment of the invention, rather than using a switch to produce a pressure signal, the pressure signal is based on the amount of current drawn by the vibration means.

This embodiment is based on the realisation that, when the toothbrush head is pressed more firmly against the teeth, the load on the vibration means is increased, and this causes it to draw more current. Thus, the device may further comprise means for sensing a current drawn by the vibration means, and the means for producing a pressure signal may be arranged to produce the pressure signal in dependence on the sensed current. By sensing the current drawn by the vibration means, an indication of the pressure applied to the toothbrush head may be obtained. This arrangement may provide the advantage that an indication of pressure can be obtained using fewer components and/or at lower cost.

This aspect of the invention may also be provided independently, and thus, according to another aspect of the invention there is provided an electric toothbrushing device comprising:
  vibration means for producing vibration of a toothbrush head;
  a battery for supply power to the vibration means;
  a controller for controlling the vibration means;
  a current sensor for sensing a current drawn from the battery by the vibration means; and
  means for producing a pressure signal indicating a pressure applied to the toothbrush head in dependence on the sensed current;
  wherein the controller is arranged to adjust the vibration produced by the vibration means in dependence on the pressure signal.

The means for producing a pressure signal may be arranged to compare a sensed current value to one or more threshold values and the pressure signal may be based on a result of the comparison. Alternatively or in addition, the means for producing a pressure signal may be arranged to map a sensed current value to a pressure value, for example using a look-up table or a function.

The device may comprise a memory for storing a pressure value for each of a plurality of different areas of the mouth. In this case the controller may be arranged to compare the pressure signal with the pressure value corresponding to an indication of the area of the mouth being brushed. The pressure values may be configurable by the user, for example using an application running on a separate processing device. This can allow different pressure values to be set for different areas of the mouth. This may help to ensure, for example, that sensitive areas of the mouth are not brushed too hard.

The device may further comprise a voltage sensor for sensing battery voltage, and the means for producing a pressure signal may be arranged to produce the pressure signal in dependence on the sensed voltage (as well as the current). For example, the device may comprise a memory for storing thresholds, and the appropriate threshold may be selected based on the value of the sensed voltage. This can allow, for example, different thresholds to be set for different voltages corresponding to different states of charge of the battery, and thus may allow the thresholds to correspond more accurately to the actual pressure applied to the toothbrush head.

The various threshold values may be generic threshold values set for all devices or may be stored in advance in memory in the toothbrush device as part of a calibration process. In either case, one or more of the thresholds may be adjustable by a user. The thresholds may be calculated dynamically for a given target (requested) pressure and/or motor speed based on values of motor current, battery voltage and/or calibration data stored in memory.

In any of the above arrangements, the device may comprise a memory for storing brushing parameters. The controller may be arranged to control the vibration means in accordance with brushing parameters stored in the memory. The stored brushing parameters may comprise at least one of: a timing for which each area of the mouth is to be brushed; a speed with which each area of the mouth is to be brushed; a maximum pressure with which each area of the mouth is to be brushed; maximum brushing dynamics for each area of the mouth; and total brushing time for a brushing session. At least one of the brushing parameters may be configurable by a user.

Corresponding methods may also be provided. Thus, according to another aspect of the invention there is provide a method of operating an electric toothbrushing device, the method comprising:
  producing vibration of a toothbrush head;
  sensing motion of the toothbrushing device to produce motion data;
  analysing the motion data to produce a feedback signal; and
  adjusting the vibration of the toothbrush head in dependence on the feedback signal.

According to a further aspect of the invention there is provided a method of operating an electric toothbrushing device, the method comprising:
  supplying power to a vibration means to produce vibration of a toothbrush head;
  sensing a current drawn by the vibration means;
  producing a pressure signal indicating a pressure applied to the toothbrush head in dependence on the sensed current; and
  controlling the vibration produced by the vibration means in dependence on the pressure signal.

Features of one aspect of the invention may be used with any other aspect. Any of the apparatus features may be provided as method features and vice versa.

Preferred features of the present invention will now be described, purely by way of example, with reference to the accompanying drawings, in which.

OVERVIEW

Embodiments of the present invention relate to smart electric toothbrush device with motion detection, brushing prediction and Bluetooth Low Energy (BLE) connectivity. In addition to tooth brushing, the device can detect brushing motions, speed, directions and pressure, and provide guidance and feedback (coaching) to the user.

In a preferred embodiment, the device features a microcontroller, acceleration sensor, brushing motor and a rechargeable battery power supply. The device is charged using inductive charging. The built-in acceleration sensor is used to detect the orientation of the brush in order to estimate which part of the teeth the is user brushing. A digital low-pass filter is implemented in the acceleration sensor to filter out the acceleration due to motor vibrations.

The device operates in two distinct modes: an online mode (when it is connected via Bluetooth) and an offline mode. In online mode, acceleration data is analysed and forwarded to a mobile device. An application running on the mobile device uses this data as a control input for various types of games or teaching/coaching programs. The user is able to start/stop the brushing motor, and the device also functions as a force feedback controller, allowing the application to control the state of the motor.

On the other hand, offline mode allows the use of the toothbrush without the active connection with a mobile device. Instead, brushing motion is continually monitored and analysed. Brushing statistics and sensor data are then saved to on board non-volatile memory for later retrieval and analysis by the mobile device application.

Figure 1:
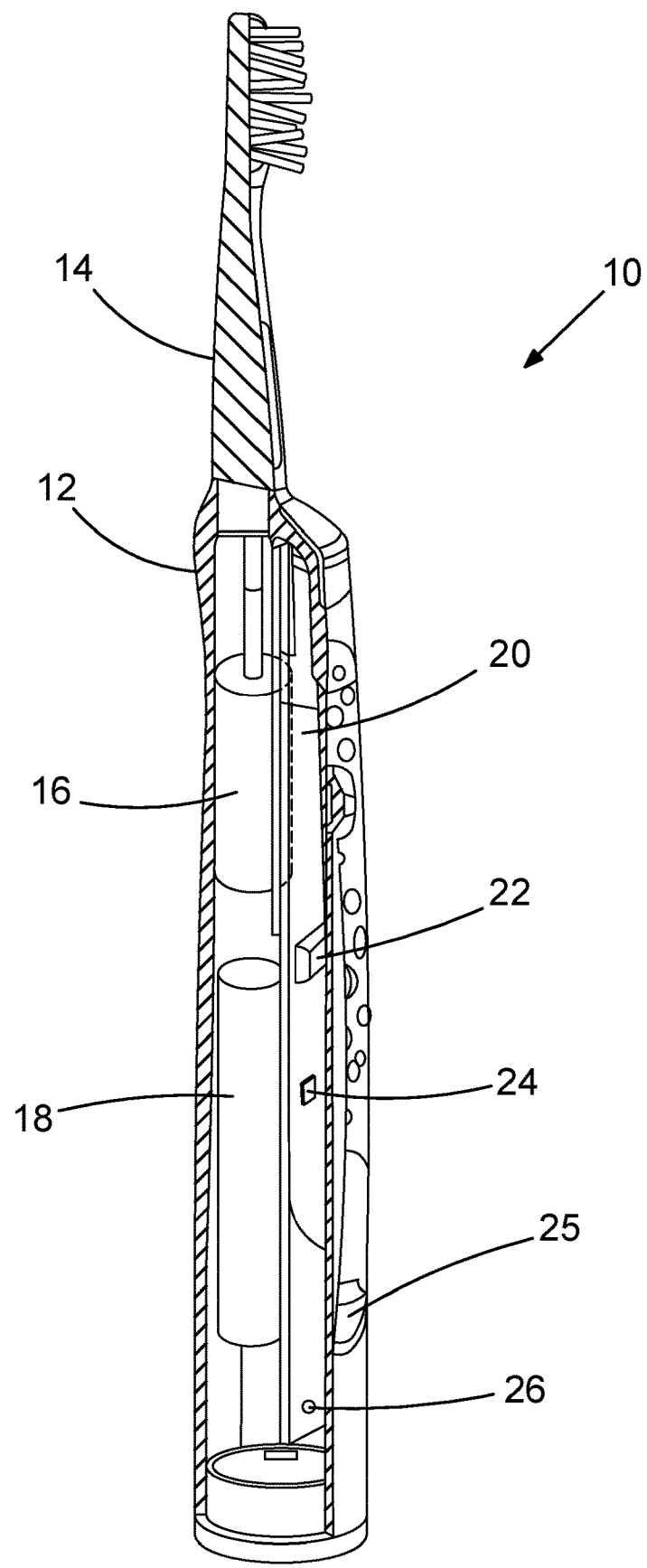
FIG. 1 shows parts of an electric toothbrush in an embodiment of the invention.

FIG. 1 shows parts of an electric toothbrush in an embodiment of the present invention. The device may be, for example, a sonic toothbrush designed to make vibrations in or above the sonic range.

Referring to FIG. 1, the toothbrush 10 comprises a toothbrush body 12 and a removable toothbrush head 14. The body 12 comprises a housing which accommodates a motor 16, a rechargeable battery 18, and a circuit board 20. A microcontroller/Bluetooth module 22, an acceleration sensor 24, and an RGB (red/green/blue) LED (light emitting diode) 26 are provided on the circuit board. The microcontroller module 22 is used to control the motor 16 to cause vibration of the toothbrush head 14, in order to brush the user's teeth. One or more buttons 25 are provided to turn the device on and off, and/or to adjust the settings.

Toothbrush System

Figure 2:
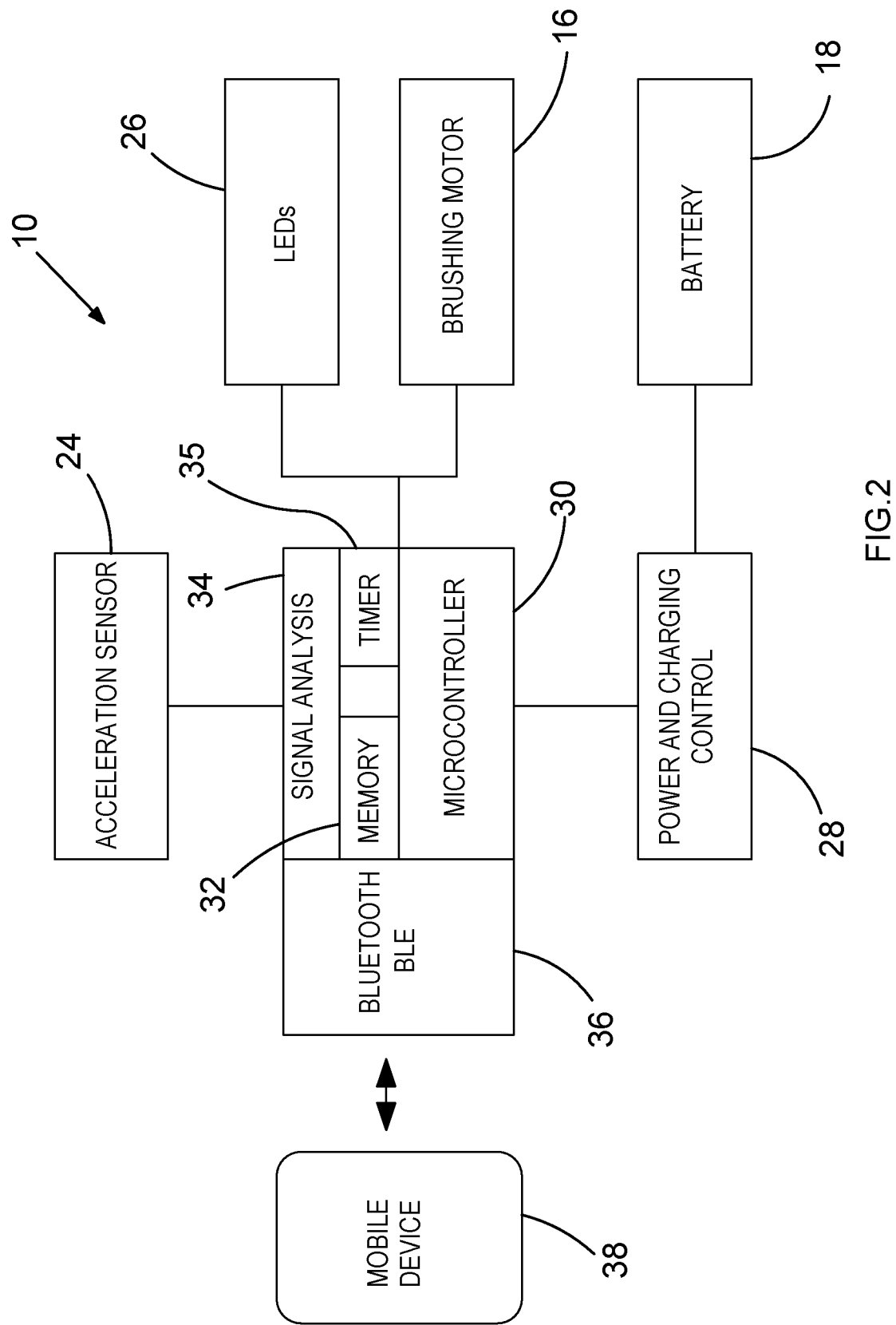
FIG. 2 is a block diagram showing key components of a toothbrush system in an embodiment of the invention.

FIG. 2 is a block diagram showing key components of a toothbrush system in an embodiment of the invention. Referring to FIG. 2, the system comprises toothbrush 10 and mobile device 38. The toothbrush 10 comprises motor 16, battery 18, acceleration sensor 24, LEDs 26, power and charging control unit 28, microcontroller 30, memory 32, signal analysis module 34, timer 35, and Bluetooth module 36. The microcontroller 30, memory 32 and signal analysis module 34 may be, for example, part of the microcontroller/Bluetooth module 22 shown in FIG. 1. The Bluetooth module 36 communicates with the mobile device 38. The mobile device 38 may be, for example, a mobile phone, a tablet computer, a laptop computer, a smart watch, or any other suitable processing device. An application running on the mobile device is used to provide feedback to the user and/or to control the toothbrush when the toothbrush is online. Although a Bluetooth low energy module is shown in FIG. 2, any other low power wireless transmission protocol, such as ZigBee, LoRa or WiFi could be used instead.

In operation, the battery 18 supplies power to the brushing motor 16, under control of the power and charging control module 28 and the microcontroller 30. The microcontroller 30 executes program code in order to control operation of the toothbrush. The memory 32 stores brushing parameters which are used by the microcontroller to perform the appropriate brushing operations, as well as other data such as brushing statistics and sensor data.

As the user brushes their teeth, the acceleration sensor 24 collects acceleration data caused by movement of the toothbrush. The signal analysis module 34 performs signal processing on the acceleration data, in order to provide feedback to the user regarding how they are brushing their teeth, and to allow control of the vibration of the toothbrush head. The timer 35 is used to time the brushing session.

Figure 3:
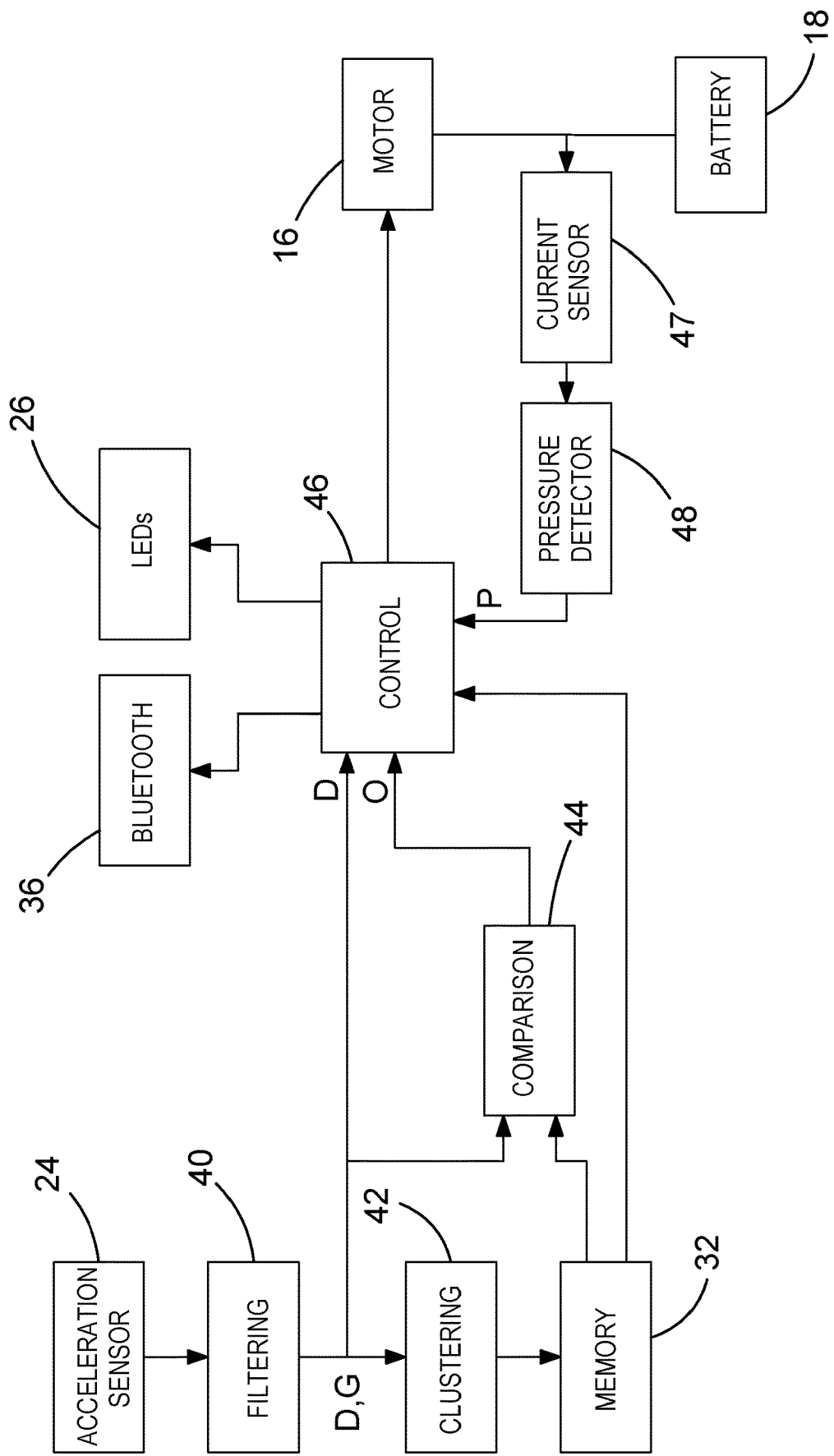
FIG. 3 shows in more detail parts of the toothbrush device which are used for feedback and control.

FIG. 3 shows in more detail parts of the toothbrush device which are used for feedback and control. Referring to FIG. 3, the device comprises acceleration sensor 24, filtering module 40, clustering module 42, memory 32, comparison module 44, control module 46, current sensor 47 and pressure detector 48 as well as Bluetooth module 36, LEDs 26, motor 16 and battery 18.

In operation, the acceleration sensor 24 collects acceleration data caused by movement of the toothbrush. The acceleration data is passed to filtering module 40. The filtering module 40 filters the acceleration data to provide an estimate of the brushing dynamics D, and a moving average value of the acceleration G, as will be explained below. The output of the filtering module 40 is fed to clustering module 42. The clustering module 42 performs a clustering process on the data received from the filtering module 40. The clustering module 42 produces clustering results which are passed to the memory 32 for storage.

The filtering module 40 and the memory 32 are both connected to comparison module 44. The comparison module 44 receives the brushing dynamics D and the moving average value of the acceleration G from the filtering module 40, and stored clustering results from the memory 32. The comparison module 44 compares the data from the filtering module 40 with the clustering results from the memory 32. The result of the comparison is an orientation signal O, which provides an indication of which area of the mouth the user is brushing. The comparison module 44 passes the orientation signal to control module 46. The control module 46 is able to control the speed of the motor 16 based on the orientation signal O. The control module 46 also provides feedback to the user, based on the orientation signal. This may be done by controlling the speed of the motor 16, controlling the LEDs 26, and/or sending a signal to the mobile device 38 via the Bluetooth module 36.

The control module 46 also receives the estimate of the brushing dynamics D from the filtering module 40. The control module 46 is also able to provide feedback and control based on the value of the brushing dynamics D.

The battery 18 supplies current to the motor 16, in order to produce vibration of the toothbrush head. The amount of current drawn by the motor 16 from the battery 18 is measured by current sensor 47. The sensed current is passed to pressure detector 48. The pressure detector 48 produces a pressure signal P based on the sensed current. The pressure signal P may also be used by the control module 46 to control vibration of the toothbrush head and/or provide feedback to the user.

Operation of the various modules shown in FIG. 3 is described in more detail below.

Filtering Module

In the filtering module 40, the data from the acceleration sensor 24 is first passed through a low-pass filter to remove vibration motions (which are at a higher frequency). The thus produced sensor data is then scaled to correct amplitude. The sensor data is then passed through three filters. One signal branch produces an estimate of the brushing dynamics D, while the second branch produces a moving average value of the acceleration G. Each component of the original measurement (in x, y and z axes) is filtered separately. The final scalar value of the dynamics estimation is produced by calculating the dynamics estimation vector length. These signals are then provided to a subsequent clustering process performed by clustering module 42.

Figure 4:
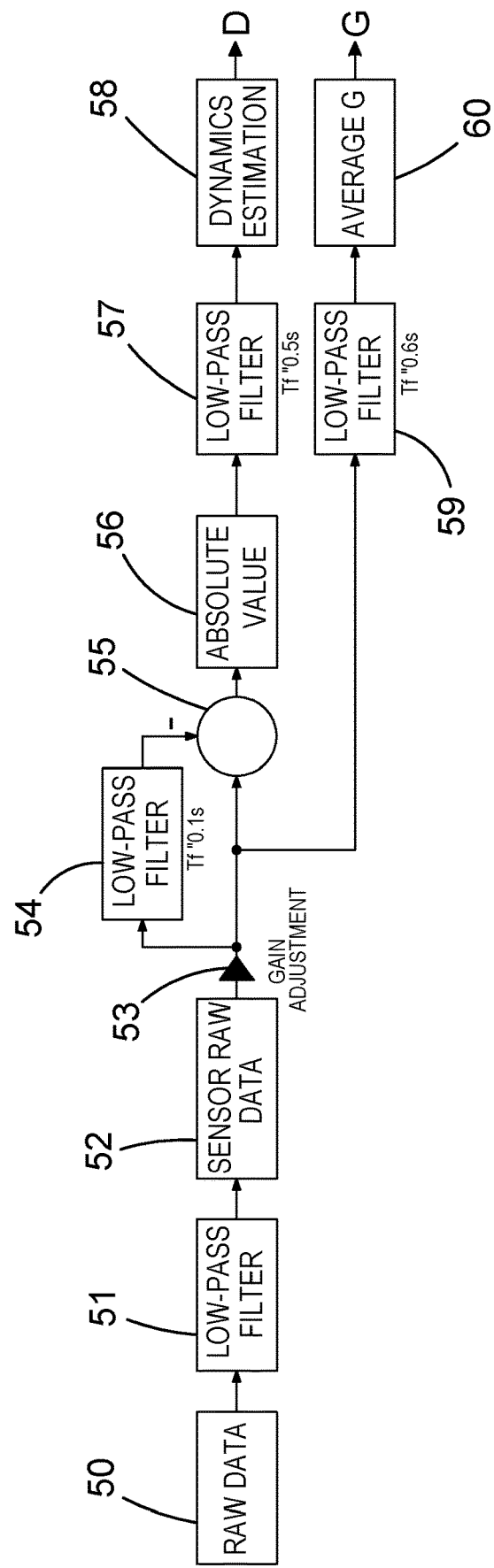
FIG. 4 illustrates the filtering process performed by the filtering module of FIG. 3.

FIG. 4 illustrates the filtering process performed by the filtering module 40. Referring to FIG. 4, raw acceleration data 50 from the acceleration sensor are passed through low pass filter 51. The cut-off frequency of the filter 51 is such that components of the acceleration data caused by manual movement of the toothbrush are passed, while high frequency components of the acceleration data caused by vibration of the toothbrush are removed. Thus the output of the low-pass filter 51 is raw sensor data 52 containing acceleration due to manual movement of the toothbrush as well as acceleration due to gravity. The raw sensor data 52 are then scaled by amplifier 53 to the correct amplitude. The scaled sensor data are then divided into two branches.

In a first branch, the sensor data are passed through low pass filter 54. The cut-off frequency of the low pass filter 54 is such that acceleration due to gravity is passed, while acceleration due to manual movement of the toothbrush is not.

The thus filtered data is then subtracted from the sensor data in subtractor 55. Thus, this operation removes acceleration due to gravity from the sensor data, leaving a linear acceleration component. The x, y and z components of the raw sensor data 52 are filtered separately.

The filtered x, y and z components are then passed to absolute value calculation module 56. The absolute value calculation module 56 calculates the absolute value of the linear acceleration from the square root of the sum of the squares of the x, y, and z components.

The absolute value of the linear acceleration data is then passed to a low-pass filter 57. The cut-off frequency of the low-pass filter 57 is set such that it passes the linear acceleration data, but removes higher frequency data. Thus, the low-pass filter 57 is used to reduce noise present in the data. The filtered absolute value of the linear acceleration data is passed to the dynamics estimation module 58. The dynamics estimation module 58 calculates the averaged magnitude (vector length) of the linear acceleration data to produce an estimation of the brushing dynamics D. The estimate of brushing dynamics D provides an indication of how strong or fast or vigorously the user is brushing their teeth.

In a second branch of the filtering process, the sensor data are passed through low pass filter 59. The cut-off frequency of the low pass filter 59 is such that it passes the gravity component of the raw sensor data 52, but not the acceleration component due to manual movement. The x, y, and z components of the raw sensor data 52 are filtered separately to yield separate x, y and z gravitational components. The gravitational filtered data is used to provide an average value of the acceleration G. The average value of acceleration G is calculated in averaging module 60 by averaging the filtered gravitational acceleration data in the x, y, and z directions.

Thus, the filtering process carried out by the filtering module 40 includes the process of passing the sensor data through filters and calculating the brushing dynamics D and the average acceleration G. The top path produces the brushing dynamics estimation (by subtracting gravity hence obtaining just linear acceleration, taking the absolute value of it and averaging to smooth it out). The bottom path produces gravitational data gravity by low pass filtering raw acceleration data. The filtered gravitational data and the dynamics estimation are passed onto the clustering module 42 for further processing.

Clustering Module

The clustering module 42 performs a clustering process on the filtered gravitational data G and the dynamics estimation D received from the filtering module 40. The clustering process produces clustering results which can be compared with subsequent acceleration data to indicate which area of the mouth the user is brushing at any given time.

The clustering module 42 performs a clustering algorithm that uses cosine distance for the cluster similarity measure instead of Euclidean distance. The angular coordinate is calculated from x and y projections of the average value of the filtered gravitational data G, while the radial component is the scalar value of the dynamics estimation D. Five clusters can be identified in the modified space represented with polar coordinates: one central cluster indicating brushing inactivity and four clusters on a ring around it. These four clusters represent the four brushing sides (top, left, right, bottom).

The clustering module 42 only performs the clustering process if it is determined that the motion data relates to brushing, rather than any other form of motion. This determination is made by comparing the value of the brushing dynamics D with maximum and minimum acceleration thresholds. If the value of the brushing dynamics D falls below the minimum acceleration threshold, it is determined that the device is not being used for brushing and so the clustering process is not performed. If the value of the brushing dynamics D exceeds the maximum acceleration threshold, it is determined that the motion is not valid, in which case the clustering process is also not performed.

In the clustering module 42, the filtered acceleration data related to brushing motion is first projected onto a cylindrical coordinate reference system. To do this, the angular coordinate is first calculated from the x and y components of the average acceleration G output from the low-pass filter 59. The radial component is the value of the dynamics estimation D. The clustering algorithm is then run on the data points.

The clustering algorithm organises similar data points into clusters. Each cluster therefore comprises data points that are similar to each other in some way and are dissimilar to data points belonging to other clusters. In this case, the clustering algorithm uses distance-based clustering. This means that two or more data points are determined to be similar if they are close together in distance. The clustering algorithm uses cosine distance for measuring the cluster similarity instead of Euclidean distance.

Each cluster is representative of a particular region of the mouth. Thus, the clusters represent a convenient way of mapping the acceleration data onto a representation of the user's mouth.

For the clustering process to work, the clusters need to be defined and associated with a particular region of the user's mouth. This is done by initially pre-loading the clustering module 42 with standard acceleration data from laboratory tests. A list of regions of the mouth for which the device should be providing feedback is then identified. The toothbrush device is then placed in a particular region of the mouth and the clusters are defined by seeing which area of the mouth the pre-loaded acceleration data corresponds to.

The clustering algorithm uses a distance threshold above which data is determined to be dissimilar to a particular data point, and below which data is determined to be similar to a particular data point and so in the same cluster. These thresholds are preprogramed into the clustering module when the device is initially set-up so that the clustering algorithm will work, even if it is the first time the user has used the device.

When the user uses the toothbrush they brush their teeth and generate their own acceleration data. The user's acceleration data (the gravitational data G and the dynamics estimation D) are then compared to the pre-defined clusters to see which area of the mouth the user's acceleration data corresponds to. G is used to determine direction and D is used to determine magnitude. The result of the comparison is the area of the mouth that the device has determined the user is brushing.

The user's acceleration data from a particular brushing session is combined with the pre-stored acceleration data already stored on the device. As the user uses the device they will generate more acceleration data which is combined with the pre-stored data. Once there is sufficient user specific acceleration data present, the clustering algorithm is run on the user specific data to generate user specific clustering results, instead of relying on the pre-defined clusters. Therefore, over time, the user's acceleration data replaces the pre-stored acceleration data and the user's clustering results replace the pre-determined clustering results. The clustering results generated using the user specific acceleration data provide a more accurate mapping between the acceleration data and the user's mouth. This allows more accurate feedback to be provided to the user.

Over time, clustering parameters used in the clustering process are updated and made more specific to an individual user. This happens when the toothbrush device is online to an external device. The Bluetooth module 36 uses a Bluetooth connection to transfer the clustering data to the external device. The main parameter to be updated will be the cluster thresholds which are used to determine which cluster the acceleration data belongs to and consequently which region of the user's mouth is being brushed. As the user uses the device, the device will collect and store more data corresponding to more brushing sessions. This data can be sent to the external device which analyses the historical data and updates the clustering thresholds if it is found that they are inappropriate (for example, too stringent or lenient) for a particular user.

For example, if a user is very consistent with their brushing technique and has well defined brushing motions for each area of the mouth, the difference between the user's maximum and minimum motions for each region of the mouth is small. This means that a user's brushing data forms small, well-defined clusters whose data points are close together. In this case, the distance threshold used by the clustering algorithm and coaching function for each cluster may be made smaller. That is, points are only considered as part of the same cluster if they are closely grouped together. The limit at which data points are not considered part of the same cluster has been reduced.

On the other hand, a user with a more erratic style of brushing has a greater difference between their maximum and minimum brushing motions for each region of the mouth. This means that a user's brushing data forms large clusters with fuzzy edges, i.e. the limit of each cluster is not well defined. The data points in each cluster are spread out. This means that the distance threshold used by the clustering algorithm and coaching function for each cluster needs to be larger to take into account the variation in data points. The limit at which data points are not considered part of the same cluster is larger and so the boundaries of neighbouring clusters may be quite close together.

The clustering thresholds therefore take into account different brushing styles. By updating the clustering thresholds, the device is able to provide tailor the clustering process to each individual user.

Figure 5:
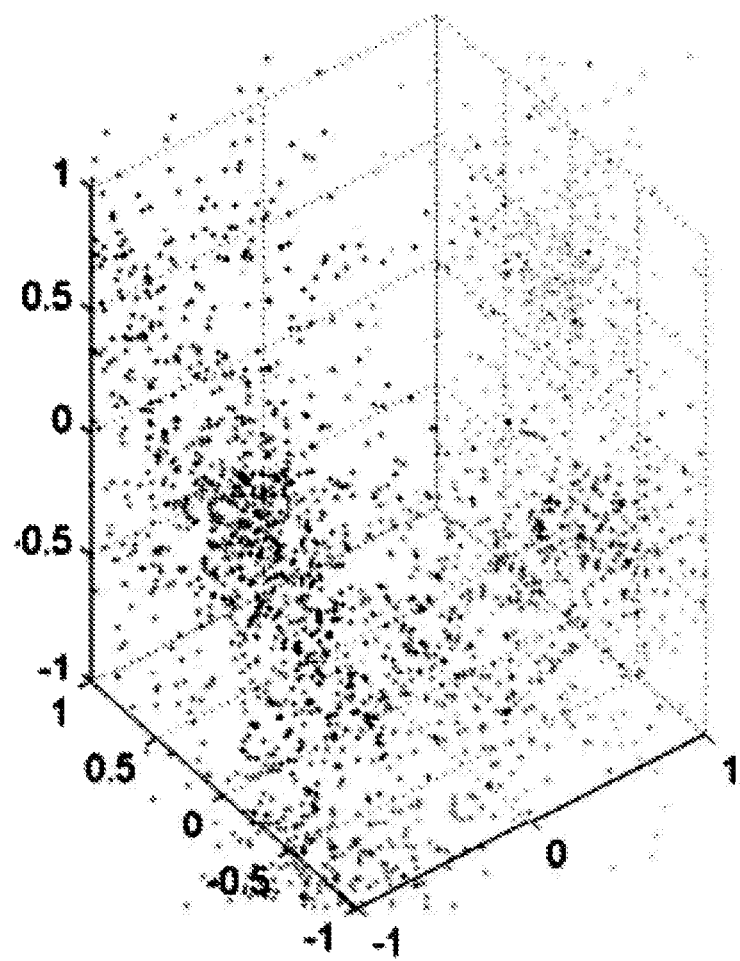
FIG. 5 shows data before a clustering process.
Figure 6:
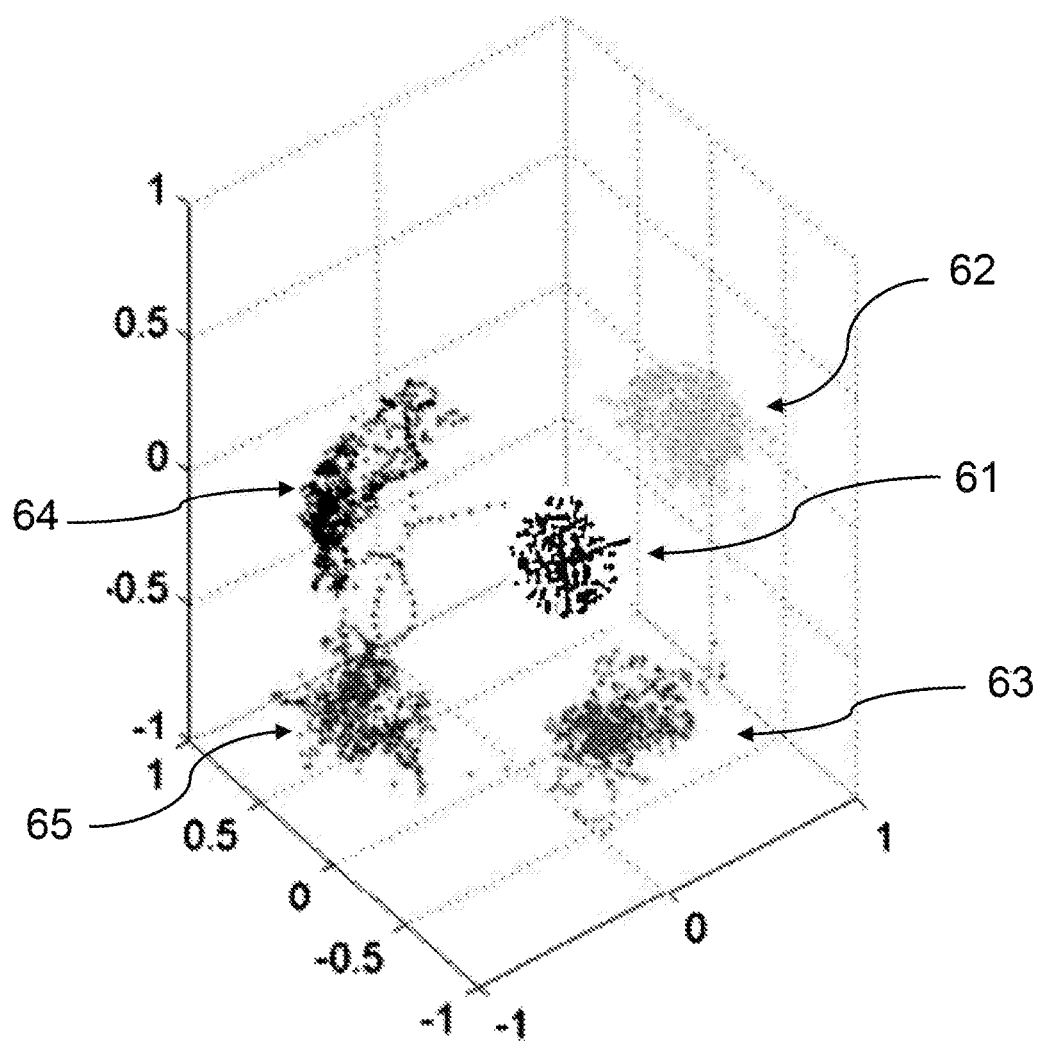
FIG. 6 shows the data after the clustering process.

FIG. 5 shows the raw data before the clustering process, and FIG. 6 shows the data after the clustering process. Referring to FIG. 6, the clustering process results in five clusters. The central cluster 61 represents no brushing activity. The four other clusters 62, 63, 64, 65 are positioned around the central cluster 61. The four clusters 62, 63, 64, 65 represent the four main areas of the mouth that will be brushed by the user. These four areas are inner top, inner bottom, outer left, and outer right.

Comparison Module

The comparison module 44 compares the data from the filtering module 40 with the clustering results from the memory 32. The result of the comparison is an orientation signal O, which provides an indication of which area of the mouth the user is brushing.

The comparison process uses dynamic clustering to indicate the region of the mouth that is being brushed. This means that the comparison process uses the current acceleration data, as well as the previous result of the comparison process to determine which area of the mouth the user is brushing. The device is therefore able to predict which area of the mouth is being brushed when it receives data which are equidistant from two clusters. This works because, typically, a user will brush adjacent areas of the mouth when brushing their teeth rather than move around the mouth in a disjointed, random manner. For example, if current acceleration data is equidistant between two clusters, each cluster representing the outer right region and inner top region, but the previous comparison result indicated that the user was brushing the outer left region of the mouth, it is highly likely that the current data corresponds to brushing the outer right region of the mouth. This is because a user is more likely to have moved from the outer left part of the mouth to the outer right part of the mouth than to have moved from the outer left to the inner top. On the other hand, if the data is equidistant from two clusters (for example, outer left and outer right) and the previous comparison indicated one of those two clusters (for example outer left), then it is assumed that the user did not change the direction and that the correct cluster is still the previous cluster (in this example, outer left).

The filtering module, clustering module and/or comparison module described above may be part of the signal analysis module 34 shown in FIG. 2, and may be, for example, as described in co-pending patent application number GB 1713034.5 in the name of the present applicant, the subject matter of which is incorporated herein by reference.

Functionality

In addition to the core features of the toothbrush, embodiments of the present invention improve on the functionality of known devices in at least the following ways:
1. Adjustable vibration speed to aid tooth cleaning efficiently.
2. Ability to measure pressure being applied during brushing.
3. Ability to save brushing profiles (preferences) via an app and use that when the app is not connected.
4. Improved feedback mechanism via a combination of lighting and vibrating systems.

These further enhancements are described below.

Automatic Vibration Adjustment

The device has a vibrating motor which controls the toothbrush head to clean the teeth. The vibration of the toothbrush head can be adapted based on settings supplied by the user explicitly and the historical patterns of brushing captured by the device. This allows the settings to be stored and adjusted automatically to create the most effective brushing pattern for the user.

The vibration parameters that can be set include the speed and timing of the vibrations, and these can also be adjusted in real time. This allows users to use the device without any combination with an external device (and still use the customized settings) since they are stored on the device directly.

Figure 7:
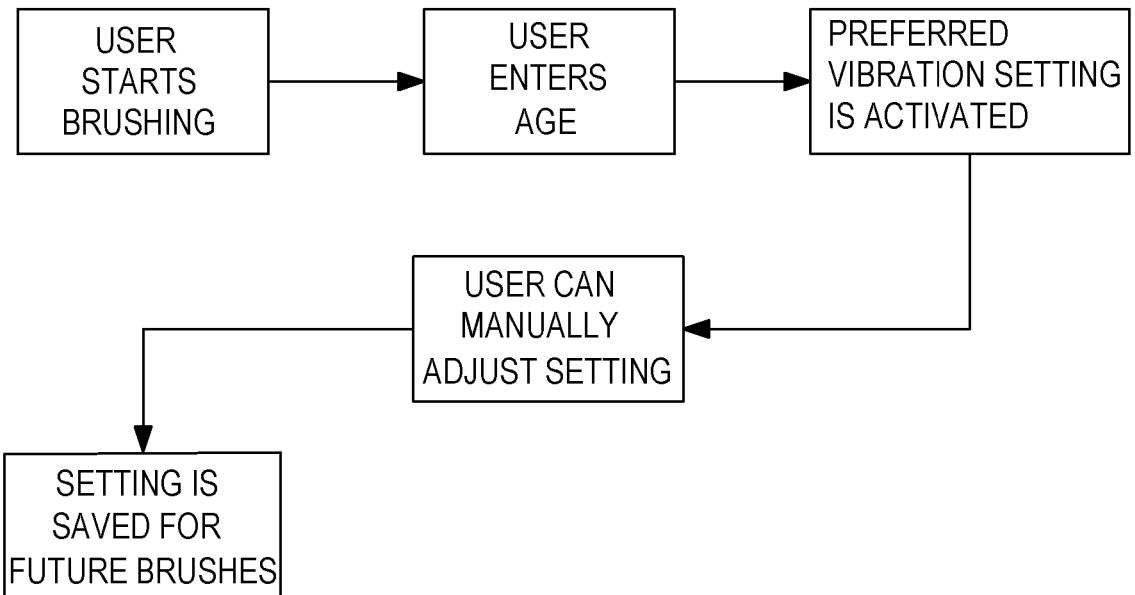
FIG. 7 shows an example of an automatic adjustable vibration process.

An example of the automatic adjustable vibration is illustrated in FIG. 7. In this example, users can first select a brushing vibration setting based on the age of the user when they first connect to the toothbrush. This setting can be further adjusted manually to suit the user. These settings are then saved to the smart brush device and can be accessed for use in the future, for both online and offline use.

Pressure Detection

The device can measure the pressure applied by the user by detecting the current that is drawn by the motor when the user is brushing. The motor current serves as an indirect pressure indicator. When a user increases the pressure by pressing the toothbrush head firmly against the teeth, the load on the motor is increased, and this causes it to draw more current. The motor current being drawn is compared against pre-set thresholds to determine the pressure being applied by the user. Feedback is given to the user either via an external device (like a smartphone) or directly on the device via LED or vibration motion.

Figure 8:
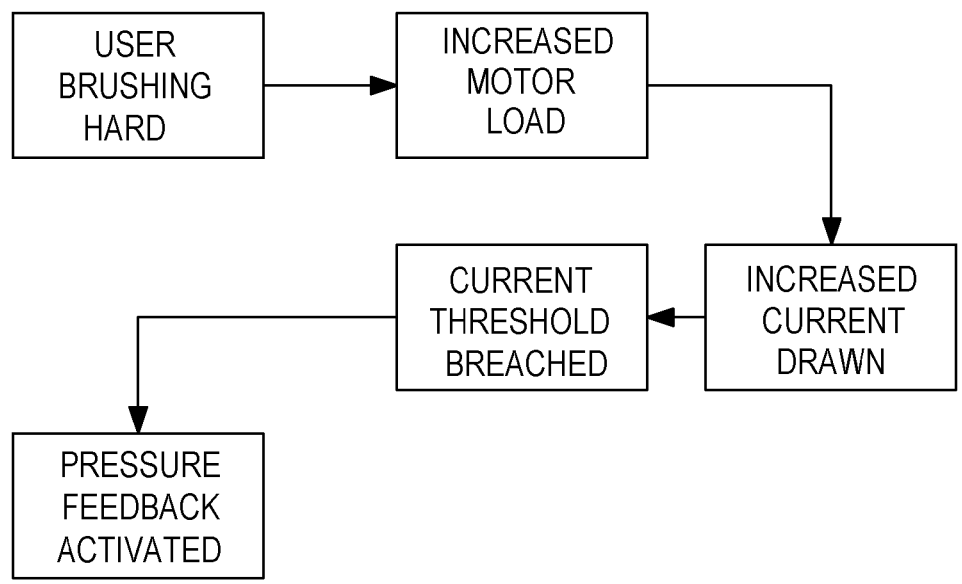
FIG. 8 shows an example of a pressure detection process.

An example of the pressure detection process is illustrated in FIG. 8, and is explained in more detail below.

Referring back to FIG. 3, in a preferred embodiment of the invention the toothbrush device is provided with a current sensor 47 and a pressure detector 48. In operation, the amount of current drawn by the motor 16 from the battery 18 while the user is brushing their teeth is detected by current sensor 47. The sensed current is fed to pressure detector 48. The pressure detector 48 compares the motor current against pre-set thresholds to determine the pressure being applied by the user. A signal P indicating pressure is fed to the control module 46. The pressure signal P may be used by the control module 46 to control vibration of the toothbrush head.

The pressure detector 48 may compare the current signal to a threshold value. In this case the pressure signal P is an indication that the pressure is above a certain value. The threshold value is initially a value which has been pre-set in the device. However the threshold value may be adapted by the user, for example using an app on their mobile device. Furthermore, different threshold values may be set, for example for different users and/or for different parts of the mouth. If desired, a plurality of different thresholds may be set, in which case the pressure signal P may indicate a plurality of different pressures, for example, low, moderate or high pressure.

Since the amount of current drawn may depend on motor speed, different thresholds may be used for different motor speeds. Furthermore, the thresholds may be adapted depending on the state of charge of the battery, to take into account the fact that the battery may be partially drained and thus not able to supply full power. This may be detected by monitoring average current over time, or current drawn when it is determined that no brushing is taking place, or the battery voltage, or some combination thereof.

Alternatively, or in addition, the pressure detector 48 may map the current value to a pressure value, for example using a look-up table or a predefined function. In this case the pressure signal P may be a value indicating how much pressure is being applied. The function or the look-up table may be adapted depending on motor speed and/or the state of charge of the battery.

An advantage of using current to determine the pressure is that it is less expensive and requires fewer components in comparison to conventional pressure sensing devices.

As mentioned above, the pressure detector 48 may compare the current signal to a threshold value and output a pressure signal P if the threshold is exceeded. The threshold value may be a value which has been pre-set in the device. For example, in one embodiment, the pre-set threshold value may be the same for all toothbrush devices. However, it has been found that the relationship between current and pressure may vary between individual toothbrush devices. Therefore, in another embodiment, each toothbrush is calibrated such that the threshold value reflects the relationship between current and pressure for that particular toothbrush. In this case, the calibration process may store the appropriate threshold value or values in a memory on the toothbrush device. This can allow each toothbrush to produce the pressure signal P in response to approximately the same pressure being applied.

Since the amount of current drawn may also depend on the state of charge of the battery, the calibration process may also set different thresholds for different states of charge of the battery, as determined for example by the battery voltage. The various thresholds may be stored in memory in the toothbrush. In this case, the pressure detector may look up the appropriate threshold based on the state of charge of the battery, compare that threshold to the current signal, and output a pressure signal P if the threshold is exceeded. If desired, a plurality of thresholds may be set representing different pressure values.

Figure 13:
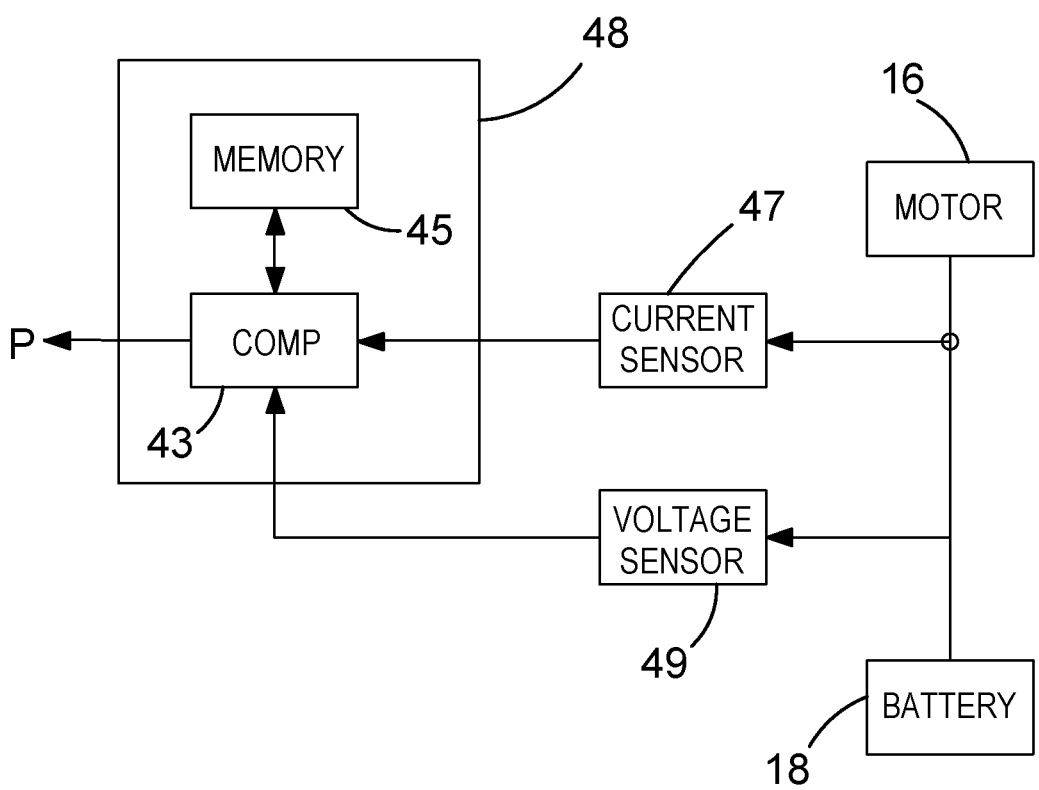
FIG. 13 shows parts of a toothbrush device in another embodiment of the invention.

FIG. 13 shows parts of a toothbrush device in another embodiment of the invention. Referring to FIG. 13, in this embodiment the toothbrush device comprises motor 16 and battery 18 which may be the same as the corresponding parts described above. The device also comprises current sensor 47 and voltage sensor 49, as well as comparison module 43 and memory 45 which are part of pressure detector 48.

In operation, the voltage of the battery 18 is measured using voltage sensor 49. The measured voltage is fed to the comparison module 43. The amount of current drawn by the motor 16 from the battery 18 is detected by current sensor 47 and fed to comparison module 43. The comparison module 43 reads a threshold value (or values) from the memory 45 based on the measured value of the battery voltage. The comparison module 43 then compares the threshold value (or values) read from the memory 45 with the sensed value of the current from the current sensor 47. If the threshold is exceeded, the comparison module outputs a pressure signal P which is fed to the control module 46 shown in FIG. 3.

In another embodiment of the invention the threshold value for the motor current is recalculated dynamically (as opposed to being fetched from memory/lookup table based on state) for a given target (requested) pressure (force) and motor speed based on present values of motor current and battery voltage and on calibration data stored in memory. Tests have shown that all relationships can be approximated by linear functions and hence calibration data can be scaled according to motor speed, target threshold force and battery voltage.

Figure 14:
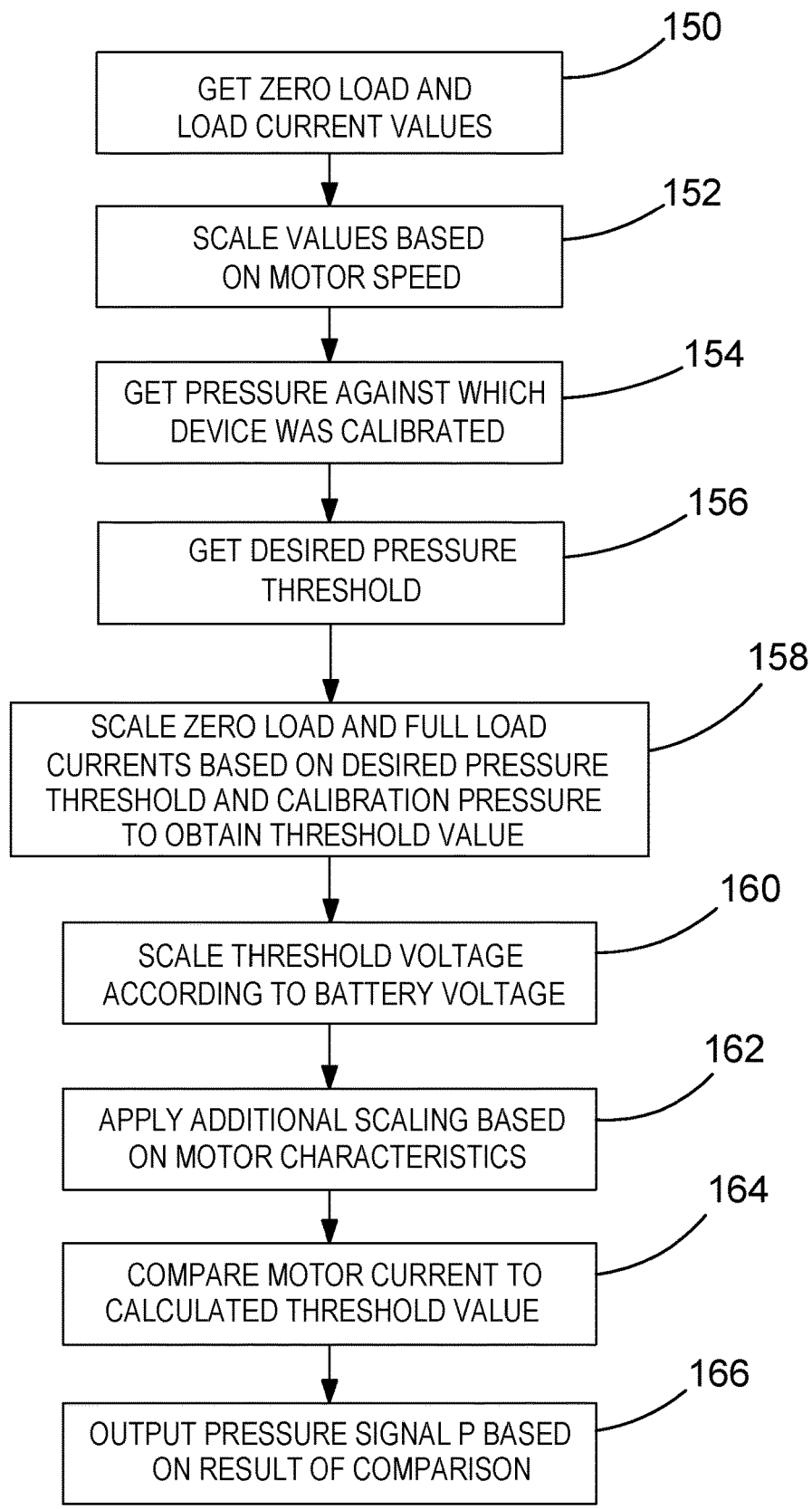
FIG. 14 shows steps taken in a pressure detection process.

FIG. 14 shows the steps taken in a pressure detection process in one embodiment of the invention. These steps may be carried out by a pressure detection module running as software on a processor such as microcontroller 30 in FIG. 2.

Referring to FIG. 14, in step 150 a zero-load current value and a load current value are read from calibration data stored in memory. These values are values which are stored in advance in the device as part of a calibration process. The zero-load current value is the current value when no pressure is applied to the toothbrush head, and the load current value is the current value when a predetermined pressure is applied to the toothbrush head. In both cases, the current values correspond to the case where the motor is at full speed (100% duty cycle).

In step 152, the zero-load current value and the load current value are scaled according to the motor duty cycle (speed) using a predetermined relationship (e.g. linear function) stored in memory. The motor duty cycle may be obtained for example from the control module 46 in FIG. 3.

In step 154, the pressure (force) against which the device was calibrated is read from memory.

In step 156 the desired threshold pressure is obtained, for example, from the control module 46 shown in FIG. 3. The desired threshold pressure is the pressure against which it is desired to compare the actual pressure, and this may vary depending on, for example, the user and the area of the mouth being brushed.

In step 158 the threshold current value is defined by scaling the zero-load and load current values based on the desired pressure threshold and the calibration pressure. This is done using predetermined relationships (e.g. linear functions) stored in memory.

In step 160 the threshold current is scaled according to the battery voltage (as measured by the voltage sensor) using a predetermined relationship (e.g. linear function) stored in memory.

In step 162 additional scaling is applied depending on motor characteristics (motor speed and calibration data) using a predetermined relationship stored in memory. This allows variations in motor characteristics to be taken into account.

In step 164 the computed current threshold value is compared to the actual motor current value. In step 166 a result of the comparison is output as pressure signal P, for example to control module 46 in FIG. 3.

The above arrangements can allow the threshold values to be calibrated for each toothbrush and adapted in dependence on the state of charge of the battery. This may allow the thresholds to correspond more closely to the actual pressure being applied.

Brush Preference Customization

The device allows individual preferences such as vibration speed, quadrant time and brushing time to be stored. These settings are stored in the memory and accessed by the controlling firmware to adapt the behaviour of the device to match the expectation of the user. This feature allows the same device to be shared by multiple users with different needs, by allowing them to select their preferred "profile" via the click of a button.

Figure 9:
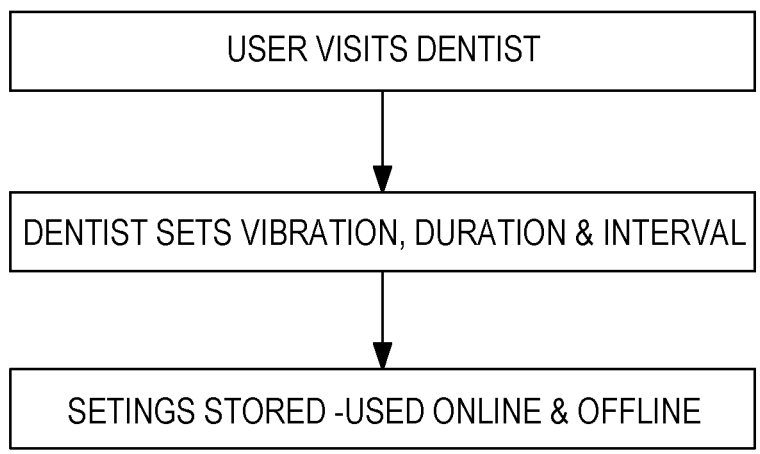
FIG. 9 shows an example of a brush preference customization process.

An example of brush preference customization is illustrated in FIG. 9. In this example, a dentist customizes the brushing vibration, duration and pattern during dental appointments. These details are stored on in an app on a mobile device (such as a mobile phone) and can be accessed by the user after leaving the dentist.

Feedback Mechanism

The device is arranged to provide feedback to the user to assist them with their brushing. Feedback may be provided in various different ways, including: on the mobile device 38 via the Bluetooth module 36; on the LEDs 26; and by controlling vibration of the motor 16.

Controlling vibration of the motor 16 extends the kind of feedback that can be provided to the user, when online (brushing while connected to a Bluetooth device), and when offline. For example, the vibration can be controlled to indicate to the user one or more of the following:

switch brushing to a different area of the mouth,
end brushing,
brushing too hard
brushing too fast.

Different patterns of vibration may be used to indicate each of the above. In addition, the RGB LED 26 allows feedback to be given in multiple colour sequences.

Figure 10:
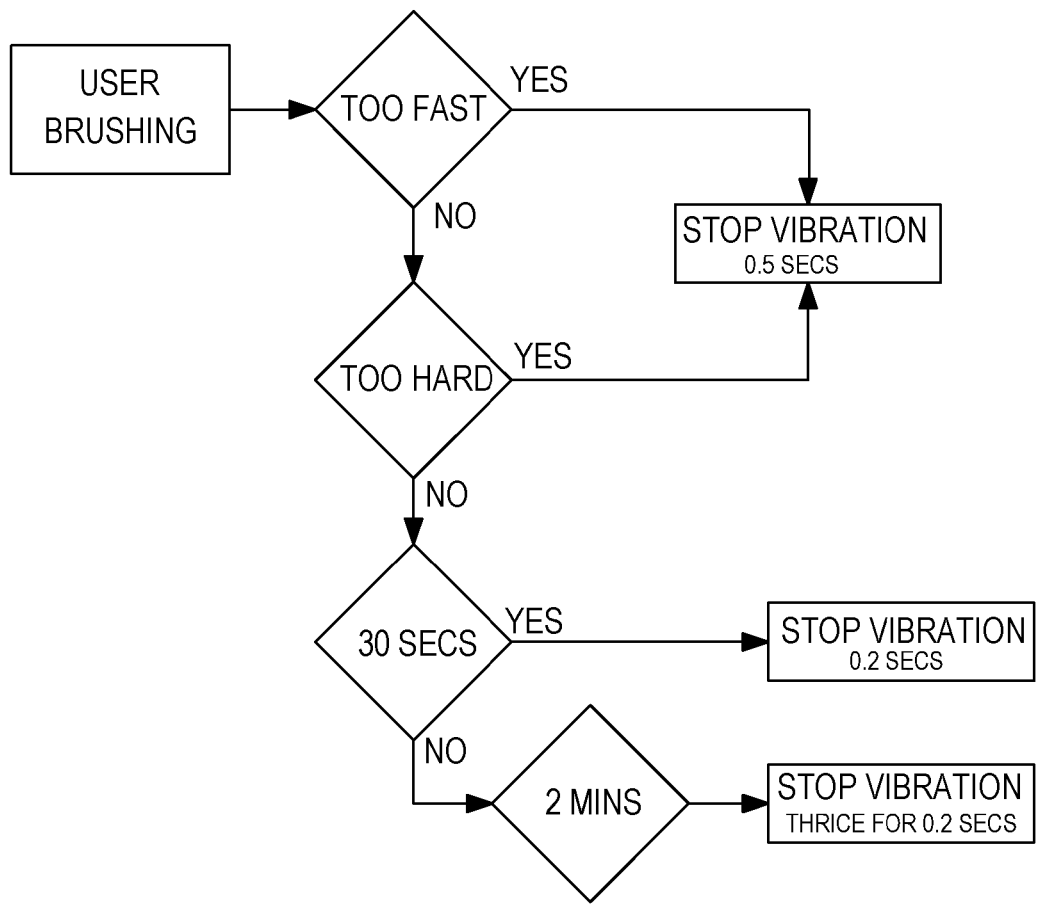
FIG. 10 illustrates how patterns of vibration may be used to give feedback to the user.

FIG. 10 illustrates one example of how patterns of vibration may be used to give feedback to the user. Further examples of the feedback which may be given to the user are set out in the table below.

| Event | Feedback |
|---|---|
| VIBRATION | |
| Too much pressure being applied by user | Stop twice for 0.5 s each |
| User is brushing too fast | Stop twice for 0.5 s each |
| After every 30 s of brushing | Stop for 0.2 s |
| After a complete brush session | Stop three times for 0.2 s |
| LIGHT | |
| Device Charging in docking station | Green blinking |
| Fully charged in docking station | Green steady |
| Needs charging (still usable) | Red blinking |
| Battery empty | Red steady |
| Advertising but not connected | Blue blinking |
| Device connecting to Bluetooth | Blue fast blinking |
| Device connected | Blue steady |
| Connection lost | Blue blinking |

Set Up

When the toothbrush device is first used, it will typically have default brushing parameters pre-installed. These parameters may include brushing speed and brushing timings. For example, a default setting may be to brush each quadrant for 30 seconds at normal speed. These parameters are stored in the memory 32, and accessed by the control unit 46 to control the motor 16.

At any stage, the user may set the brushing parameters using an application installed on a mobile device or any other suitable processing device such as a computer. The process of setting the brushing parameters is illustrated in FIG. 11.

Figure 11:
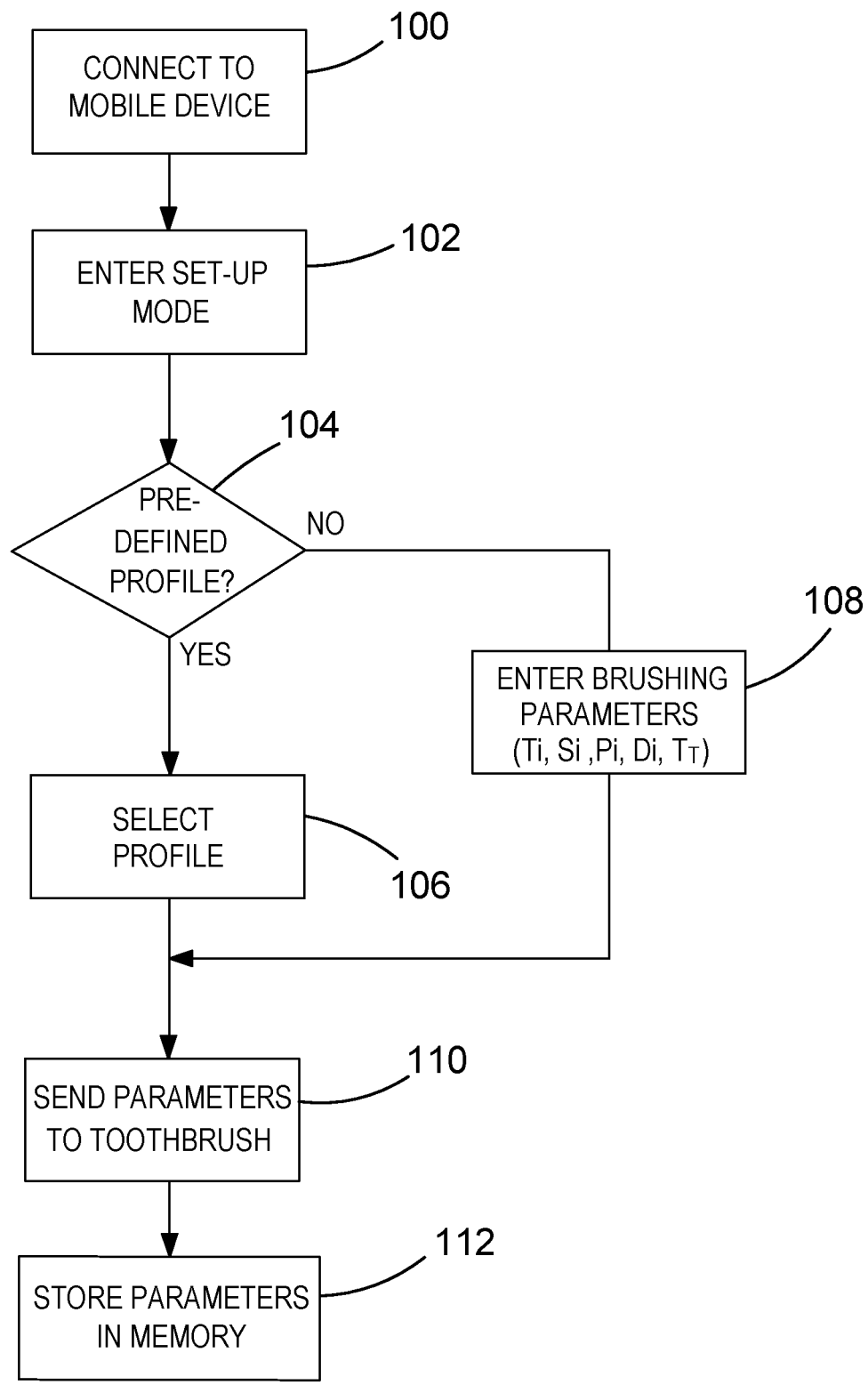
FIG. 11 shows a process of setting brushing parameters.

Referring to FIG. 11, in step 100 the toothbrush device is connected to a mobile device or other processing device. In step 102 an application running on the mobile device enters set-up mode. In step 104 it is determined whether the user wishes to use a pre-defined brushing profile, or to set up their own brushing profile. A number of pre-defined brushing profiles may be defined based, for example, on the age of the user, the user's dental history, or the preferences of the user (e.g. normal or soft brushing). Each of these profiles has predefined brushing parameters.

If the user wishes to use a predefined brushing profile, then in step 106 the predefined profile is selected. If on the other hand the user wishes to enter their own brushing parameters, then in step 108 the user enters their own brushing parameters. The brushing parameters may include: the timings $T_i$ for which each area of the mouth is to be brushed; the speed $S_i$ at which each area of the mouth is to be brushed; the maximum pressure $P_i$ at which each area of the mouth is to be brushed; and the maximum brushing dynamics $D_i$ for each area of the mouth (where for four quadrants i=1 . . . 4). These parameters may be the same or different for each area. In addition, the total brushing time $T_T$ may be set. The value of $T_T$ may be the sum of the individual timings $T_i$ for each area, or some other value.

In step 110 the application running on the mobile device sends the brushing parameters to the toothbrush device via Bluetooth. In step 112 the brushing parameters are stored in memory 32. The brushing parameters are then available to the control unit 46.

The above process may be repeated for different users, so that different brushing profiles are available for different users of the toothbrush.

Control Module

The control module 46 is operable to control operation of the motor 16 based on brushing parameters stored in the memory 32. In addition, some brushing parameters, such as initial brushing speed, may be set by the user using the button 25 on the toothbrush.

In a preferred embodiment of the invention, the control module 46 is also arranged to control vibration of the motor 16 in dependence on one or more of the orientation signal O, the brushing dynamics D and the pressure signal P. Broadly, control of the vibration of the motor is for one of two purposes: firstly, to provide feedback to the user to guide their brushing; and secondly to adapt the speed of vibration to suit the user's brushing technique, personal preferences or dental history.

For example, the ability to determine exactly where the user has brushed, and not just how long the user has brushed allows the device to adjust the vibration timings more intelligently. For example, if a user changes sides randomly, the device can still notify the user that a side has been brushed for the required 30 seconds, even though the 30 seconds might be reached at any point since the start of the brush.

The device can also let users set their own personalised brushing patterns, for instance: brush each quadrant for 15 seconds at a time, repeating the process twice; or brush each quadrant for 10 seconds at a time, repeating the process thrice. These different settings mean that the brush vibration will occur at different times when measured solely using time brushed.

The device can also adjust the speed of vibration in dependence on where the user is brushing. It may be desirable to brush certain areas of the mouth at different speeds from other areas. For example, gums should normally be brushed less hard than teeth. Thus, the device may be programmed to brush areas of the mouth with sensitive gums, or areas where the user is prone to over-brushing, at a lower speed than other areas.

The control module may also be programmed to stop or slow down vibration if the user is brushing too long in one area, and/or to stop or slow down vibration if the user starts brushing one area without completing another.

The control module 46 may also control the speed of the motor based on the brushing dynamics D received from the filtering module 40. For example, the control module may slow down or stop vibration if it is determined that the user is brushing too fast (moving through the mouth too quickly).

In addition, the control module 44 may control the speed of the motor based on the pressure signal P received from the pressure detector 48. For example, the control module may slow down or stop vibration if it is determined that the user is brushing too hard. Alternatively, the speed of vibration may be set based on based on a value indicating how much pressure is being applied. For example, the speed of vibration may be reduced as an increasing pressure is applied. This may help to ensure that the user does not over-brush their teeth, and thus may help to compensate for deficiencies in the user's brushing technique.

Figure 12:
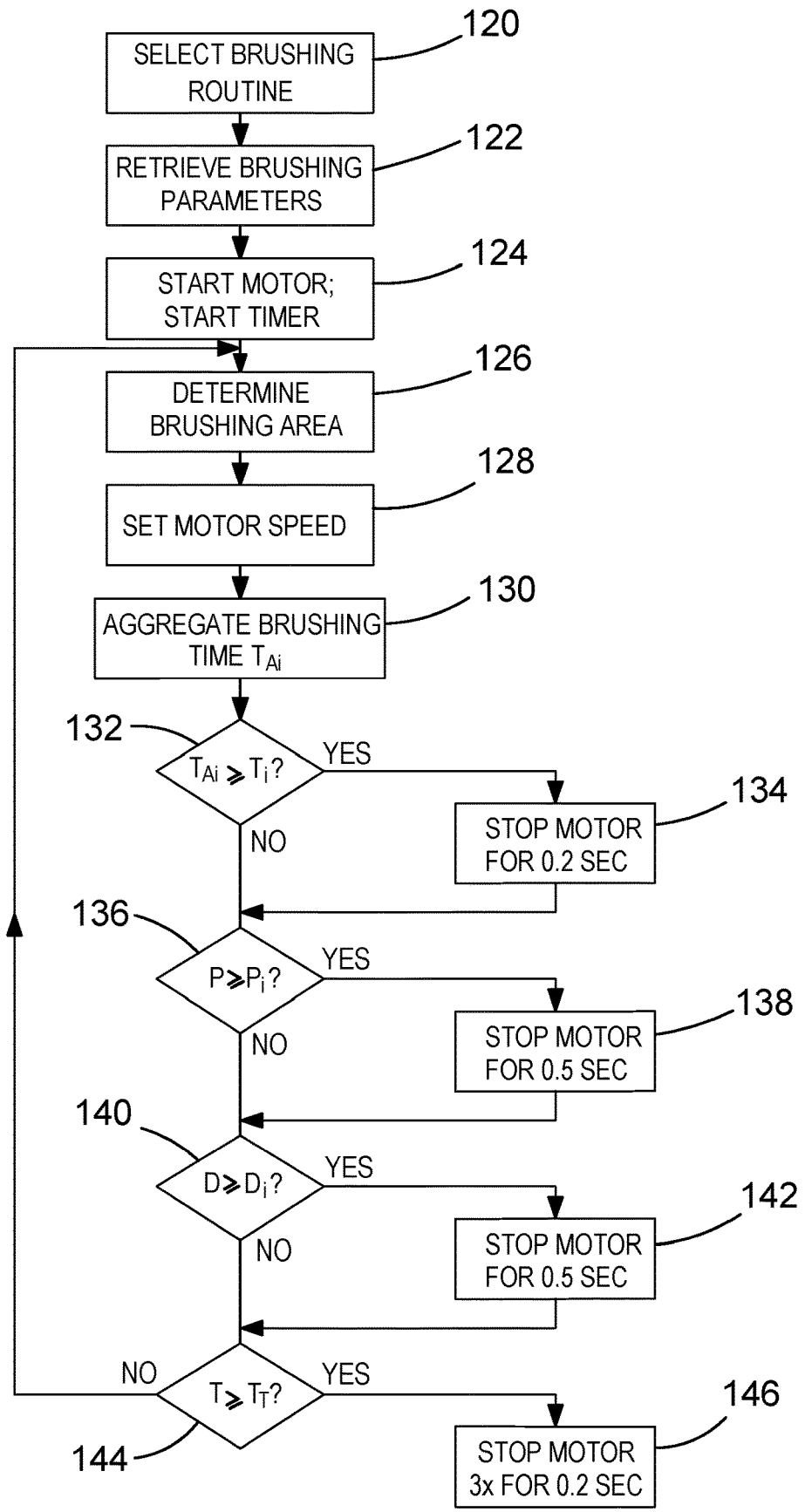
FIG. 12 shows a control and feedback process.

FIG. 12 illustrates the control and feedback process carried out by the control module 46 in one embodiment of the invention. Referring to FIG. 12, in step 120 the brushing routine to be used is selected. This may be done either via a button 25 on the toothbrush, or via an app on the user's mobile device. In step 122 the control module retrieves the brushing parameters for that brushing routine from the memory 32. In step 124 the control module starts the motor 16. Also in step 124, the control module starts the timer 35. At this point the user starts to brush their teeth.

In step 126 the control module determines the area of the mouth which is currently being brushed from the orientation signal O. In step 128 the control module sets the brushing speed for that area of the mouth, based on the brushing parameters retrieved from the memory 32.

In step 130 the control module aggregates the brushing time $T_{Ai}$ for each area of the mouth. This is done by using the timer 35 to measure the amount of time spent in each area, and, for each area, adding the times spent in that area. Thus, even if the user has switched back and forth between different brushing areas, the total amount of time spent in each area is measured.

In step 132 the control module 46 determines, for each area of the mouth, whether the aggregated brushing time $T_{Ai}$ is greater than the timing $T_i$ which has been set for that area. If in step 132 it is determined that the aggregated brushing time $T_{Ai}$ is greater than the timing $T_i$ for any particular area, then in step 134 the control module stops the motor for 0.2 seconds. This provides a tactile feedback to the user encouraging them to switch brushing to a different area. A visual feedback may also be provided on the toothbrush device via LEDs 26, and/or on the mobile device 38.

Alternatively or in addition, when the control module 46 determines that the aggregated brushing time $T_{Ai}$ is greater than the timing $T_i$ for a particular area (or some other value such as a predetermined maximum timing value), the control module may slow down or stop the motor until the user has moved the toothbrush to a different area. This may help to prevent over-brushing of a particular area.

In step 136 the control module 46 determines, for the area of the mouth being brushed, whether the pressure signal P is greater than the pressure value $P_i$ which has been set for that area of the mouth. If it is determined that the pressure signal P is greater than the pressure value $P_i$, then in step 138 the control module stops the motor for 0.5 seconds. This provides a tactile feedback to the user encouraging them to brush more gently. A visual feedback may also be provided on the toothbrush device via LEDs 26, and/or on the mobile device 38. Alternatively or in addition, the control module may slow down or stop the motor while the pressure signal P is greater than the pressure value $P_i$, or some other threshold such as a predetermined maximum pressure threshold.

In step 140 the control module determines, for the area of the mouth being brushed, whether the brushing dynamics signal D is greater than the brushing dynamics value $D_i$ which has been set for that area. If it is determined that the brushing dynamics signal D is greater than the brushing dynamics value $D_i$, then in step 142 the control module stops the motor for 0.5 seconds. This provides a tactile feedback to the user encouraging them to brush more slowly. A visual feedback may also be provided on the toothbrush device via LEDs 26, and/or on the mobile device 38. Alternatively or in addition, the control module may slow down or stop the motor while the brushing dynamics signal D is greater than the brushing dynamics value $D_i$, or some other threshold such as a predetermined maximum brushing dynamics threshold.

In step 144 it is determined whether the current brushing time T as recorded by the timer is greater than the total brushing time $T_T$ which has been set. If the current brushing time T is greater than the total brushing time $T_T$, then in step 146 the control module temporarily stops the motor three times for 0.2 seconds each time. This indicates to the user that they should end the brushing session.

As an alternative, in step 146 the control unit could slow down or stop the motor, to signal the end of the brushing session. In this case, the user may optionally override step 146, for example by pushing a button on the toothbrush or via the app on their mobile device. In response, the control unit may continue operation of motor, for example, for an additional 30 seconds. Similar, if desired, the user may override timings for each area of the mouth.

By using the control module to control the motor in the ways described above, the toothbrush device can not only provide feedback to the user to guide their brushing, but can also adapt the brushing to help correct deficiencies in the user's brushing technique and/or to suit particular preferences or the dental health of the user.

In the above description, preferred features of the invention have been described with reference to various embodiments. However, it will be appreciated that the invention is not limited to these embodiments, and variations in detail may be made within the scope of the appended claims.

The invention claimed is:

1. An electric toothbrushing device comprising:
    a vibration unit arranged to produce vibration of a toothbrush head;
    a controller arranged to control the vibration unit;
    a motion sensor arranged to sense motion of the electric toothbrushing device to produce motion data;
    a signal analysis unit arranged to analyse the motion data to produce a feedback signal; and
    a timer arranged to measure a brushing time;
    wherein the controller is arranged to aggregate times spent in a brushing area, to compare an aggregated time spent in the brushing area to a pre-set timing value, and to adjust the vibration produced by the vibration unit in dependence on a result of the comparison, and
    wherein, when the aggregated time spent in the brushing area is equal to or exceeds the pre-set timing value, the controller is arranged to stop or slow down the vibration produced by the vibration unit until the electric toothbrushing device moves to another area.

2. A device according to claim 1, wherein the controller is arranged to control at least one of speed or timing of the vibration produced by the vibration unit in dependence on the feedback signal.

3. A device according to claim 1, wherein the controller is arranged to temporarily stop or slow down the vibration produced by the vibration unit in dependence on the feedback signal.

4. A device according to claim 1, wherein the controller is arranged to set a speed of the vibration produced by the vibration unit to a predetermined value in dependence on the feedback signal.

5. A device according to claim 1, wherein the feedback signal comprises an indication of an area of a mouth being brushed and the controller is arranged to temporarily stop or slow down the vibration produced by the vibration unit to indicate to a user when the area of the mouth has been brushed for a predetermined length of time.

6. A device according to claim 1, further comprising a memory for storing the pre-set timing value, wherein the pre-set timing value is configurable by a user.

7. A device according to claim 1, wherein the controller is arranged to compare a total length of time spent brushing to a pre-set total brushing time value, and to change a speed of the vibration produced by the vibration unit in dependence on a result of the comparison of the total length of time spent brushing to the pre-set total brushing time value.

8. A device according to claim 1, wherein the feedback signal comprises an indication of an area of a mouth being brushed, the electric toothbrushing device further comprising a memory for storing a vibration speed value for each of a plurality of different areas of the mouth, wherein the controller is arranged to set a speed of vibration produced by the vibration unit to the vibration speed value corresponding to the indication of the area of the mouth being brushed.

9. A device according to claim 1, further comprising a pressure signal unit arranged to produce a pressure signal indicating a pressure applied to the toothbrush head, wherein the controller is arranged to compare the pressure signal with a predetermined pressure value, and to adjust the vibration produced by the vibration unit in dependence on a result of the comparison of the pressure signal with the predetermined pressure value.

10. A device according to claim 9, further comprising a current sensor arranged to sense a current drawn by the vibration unit, wherein the pressure signal unit is arranged to produce the pressure signal in dependence on the sensed current.

11. An electric toothbrushing device comprising:
    a vibration unit arranged to produce vibration of a toothbrush head;
    a controller arranged to control the vibration unit;
    a motion sensor arranged to sense motion of the electric toothbrushing device to produce motion data; and
    a signal analysis unit arranged to analyse the motion data to produce a feedback signal;
    wherein the controller is arranged to adjust the vibration produced by the vibration unit in dependence on the feedback signal, and wherein the signal analysis unit comprises a processor arranged to:
produce, from the motion data, estimates of brushing dynamics and estimates of average acceleration;
produce an indication of an area of a mouth being brushed based on the estimates of brushing dynamics and the estimates of average acceleration;
perform a clustering process on the estimates of brushing dynamics and the estimates of average acceleration to produce clustering results, the clustering results comprising a plurality of clusters each of which represents a brushing area;
store the clustering results in memory; and
compare subsequent estimates of brushing dynamics and estimates of average acceleration with the stored clustering results, thereby to yield the indication of the area of the mouth being brushed.

12. An electric toothbrushing device comprising:
a vibration unit arranged to produce vibration of a toothbrush head;
a controller arranged to control the vibration unit;
a motion sensor arranged to sense motion of the electric toothbrushing device to produce motion data; and
a signal analysis unit arranged to analyse the motion data to produce a feedback signal;
wherein the controller is arranged to adjust the vibration produced by the vibration unit in dependence on the feedback signal;
wherein the feedback signal comprises an indication of brushing dynamics;
wherein the controller is arranged to compare the indication of brushing dynamics with a pre-set brushing dynamics value, and to adjust the vibration produced by the vibration unit in dependence on a result of the comparison; and
wherein the controller is arranged such that, when the indication of brushing dynamics is equal to or exceeds the pre-set brushing dynamics value, the vibration produced by the vibration unit is stopped or slowed down.

* * * * *